United States Patent [19]

Hollmann et al.

[11] Patent Number: 5,524,271
[45] Date of Patent: Jun. 4, 1996

[54] PRESENTATION SYSTEM FOR MESSAGES THAT PROVIDE INFORMATION ON DEMAND AND TRANSMITTER STATION AND RECEIVER STATION FOR USE IN SUCH PRESENTATION SYSTEM

[75] Inventors: Hendrik D. L. Hollmann; Constantijn D. Holzscherer, both of Eindhoven, Netherlands

[73] Assignee: U.S. Philips Corporation, New York, N.Y.

[21] Appl. No.: 400,404

[22] Filed: Mar. 7, 1995

Related U.S. Application Data

[63] Continuation of Ser. No. 924,864, Aug. 3, 1992, abandoned.

[30] Foreign Application Priority Data

Aug. 2, 1991 [EP] European Pat. Off. ............... 91201998

[51] Int. Cl.⁶ .................................................. H04H 1/02
[52] U.S. Cl. .................................. 455/3.1; 348/7; 348/17; 455/6.1
[58] Field of Search ......................... 455/3.1, 6.1, 6.2, 455/185.1, 186.1; 348/6, 7, 17; 370/94.1, 94.2

[56] References Cited

U.S. PATENT DOCUMENTS

| | | | |
|---|---|---|---|
| 4,894,714 | 1/1990 | Christis | 358/86 |
| 4,975,771 | 12/1990 | Kassatly | 358/146 |

FOREIGN PATENT DOCUMENTS

9013970  11/1990  WIPO.

*Primary Examiner*—Chi H. Pham
*Attorney, Agent, or Firm*—David Schreiber

[57] ABSTRACT

In a presentation system a transmitter station transmits messages that provide information on demand. Such message is divided into parts. An earlier part of the message is presented more often than at least one later part of the messages. In particular, the presentation pattern is such that upon accessing the message's firts parts all other parts can be contiguously accessed according to a standard presentation velocity as from a time instant that is within a prespecified distance in time from the start of accessing said first part. In particular, the distance may be zero.

8 Claims, 2 Drawing Sheets

| | t1 | t2 | t3 | t4 | t5 | t6 | t7 | t8 | t9 | t10 | t11 | t12 | | |
|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | FIG. 2A1
| | 7 | 2 | 3 | 2 | 5 | 2 | 7 | 2 | 3 | 2 | 5 | 2 | 7 | 2 | 3 | FIG. 2A2
| | 8 | 4 | 5 | 4 | 6 | 3 | 8 | 4 | 5 | 4 | 6 | 3 | 8 | 4 | 5 | FIG. 2A3

| 1 | 2 | 3 | 4 | 5 | 6 | 7 | 8 | FIG. 2B |

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
|   | 2 | 3 | 2 | 5 | 2 | 7 | 2 | 3 | 2 |   | 2 |   | 2 | 3 | 2 |
|   |   |   | 4 |   | 3 |   | 4 |   | 5 |   | 3 |   | 7 | 5 | 4 |
|   |   |   |   |   | 6 |   | 8 |   |   |   | 4 |   |   |   | 8 |
|   |   |   |   |   |   |   |   |   |   |   | 6 |   |   |   |   |

FIG. 2C

| 7 | 2 | 3 | 2 | 5 | 2 | 7 | 2 | 3 | 2 | 5 | 2 | FIG. 3A |
| 8 | 4 | 5 | 4 | 6 | 3 | 8 | 4 | 5 | 4 | 6 | 3 |

| 2 | 3 | 4 | 5 | 6 | 7 | 8 | FIG. 3B |

| 4 | 6 | 5 | 7 | 4 | 8 | 5 | 6 | 4 | 7 | 5 | 8 | FIG. 4A |

| 4 | 5 | 6 | 7 | 8 | FIG. 4B |

PRESENTATION SYSTEM FOR MESSAGES THAT PROVIDE INFORMATION ON DEMAND AND TRANSMITTER STATION AND RECEIVER STATION FOR USE IN SUCH PRESENTATION SYSTEM

This is a continuation of application Ser. No. 07/924,864, filed Aug. 3, 1992, now abandoned.

FIELD OF THE INVENTION

The invention relates to a presentation system for presenting messages that provide information on demand to an intended receiver, and wherein a particular message is divided into parts that each are recurrently in time presented to a presentation medium. The presentation medium may be one or more broadcast channels in parallel, one or more line interconnections in parallel, or other. A well-known example is Teletext, wherein a sequence of teletext pages are repeatedly broadcast in a fixed sequence, and a subscriber may access any page by means of association with an address. When the intended page appears, it may be stored locally and subsequently be viewed for an arbitrary interval. A teletext page may be an isolated item, or it may form part of a series of items that have linked contents, such as a plural-page publication would have. The time between addressing and appearance, the so-called latency, has long been recognized as a problem and various mechanisms have been proposed for improvement, such as:

— presenting more often those pages that are in high demand;

— limiting the number of pages;

— prerecording, in that such pages that "relate" to an accessed page are co-addressed and stored, although it is not sure that they will effectively be required; these linked pages may occur in the sequence after the page accessed first, or before it;

— increasing the number of channels, and/or the throughput on any particular channel.

Latency, of course, has two aspects, the avenge latency, and the maximum latency. In particular, the maximum latency has been viewed as presenting consumer nuisance. The way of using may be various:

— still pages, such as Teletext;

— a sequence of frames according to a prespecified sequence at standard presentation speed as a movie;

— a continuous stream of audio, such as music;

— semi-randomly addressable.

SUMMARY OF THE INVENTION

Amongst other things, it is an object of the present invention to diminish maximum latency, without having recourse to a great extent of prerecording. Prerecording, herein, is storing such information before the receiver has signalled that it is intended to need a particular information. Access to the first part of a message will raise appreciably the chance that later parts also will be accessed, particularly when a user would feel that missing such later part would render the message incomplete, such as a movie, a piece of music or a set of coherent dam. Storing such later part is then postrecording. Access to a particular message has Little consequence for the chance that a particular other message also will be accessed. Storing the latter would then be prerecording. Of course, there is no yes/no discrimination between prerecording and postrecording, such as in could be the case in an interactive setting, where a user response could decide on branching left or right in an animated movie's program. Generally, the lower the probability that a particular next item could be accessed, the more storage accommodation in general is required. Therefore, generally, prerecording is expensive, because there is usually no clue available as to what message an unknown user would access next, while broadcasting and the like is quite cheap in comparison to such recording at multiple locations. According to one of its aspects, the invention provides a presentation system that is characterized in that at least one earlier part of the message is presented more often than at least one later part of the message.

The general idea is based on the insight that the latency now may be determined largely by the first part in the sequence of parts. Later parts are transmitted relatively rarely. Due to the fact that the receiver knows what to look for, as it were, besides the first part, all other parts that would be necessary may now be postrecorded even before the first part is encountered actually. It will be shown that such will effectively diminish the maximum latency under all circumstances.

Advantageously, said parts are presented according to a presentation pattern that upon accessing of the message's first part allows contiguous accessing of all other parts according to a standard presentation velocity as from a time instant that is within a prespecified distance from the start of accessing said first part. The standard presentation velocity would correspond to the velocity a receiver would want to actually receive successive parts of a message. Sometimes, this standard velocity is known beforehand, such as in case of a movie or a piece of music. In other cases, at least an educated guess can be made about it, such as a standard reading velocity through a page of text. In text, the reader may turn the pages independently. In other fields of use, the receiving person is passive as regards the presentation velocity. Preferably, the said distance is zero. Upon reception of the first part, user access to succeeding parts is unencumbered.

Advantageously, any said part has an average recurrence time, and wherein said average recurrence times for the respective parts form a series that is substantially non-decreasing as a function of the position of occurrence of the associated part within the message. It has been found that the optimum is to have the series non-decreasing. For infinitely short parts, the recurrence times should be proportional to their position in the message, which in practice is not attainable. Further, for particular reasons, the monotonicity of the series may be interrupted at one or at a few points.

Advantageously, said medium has an inherent multiplicity, that each receive respective selections among said parts. The multiplicity, as herein defined, with respect to a single message is the maximum number of parts that is simultaneously presented to the medium. For example, if three parts can be presented at their normal viewing (for a movie) velocity, the multiplicity is equal to three. If the presentation velocity is twice as high, thereby allowing for time division multiplex, the multiplicity is equal to six. For the medium as a whole, as opposed to the medium as applicable to a single message, as defined supra, there may be many more message presentable simultaneously, such as in the case of radio broadcast.

Advantageously, for an earlier part a product of a maximum value of an actual recurrence interval and an inherent multiplicity of said medium is less than said message's length for standard presentation, while for a later part said product exceeds said length. Now, in particular the multiplicity of the medium allows to transmit later parts relatively rarely, while by a kind of somewhat randomizing sequencing of those later parts still keeping the secondary latency quite low, that is, after presentation of any part to a user, the next part either follows directly as presented by the source, or it had been received earlier, so that it may be reproduced from postrecording storage.

Advantageously, for at least a first subset of earlier parts within said message said recurrence interval is uniform in time, and for at least a second subset of later parts within said message said recurrence interval is non-uniform in time. Although, repeating the first part of a message continually produces a simple repetition pattern, in various respect the performance may be raised by a more complicated pattern as recited. Note that the presentation of a message part to the medium may be at multiple speed of the standard accessing speed of a user. In that case, the channel is multiple by time division multiplex. Other types of multiplicity are feasible as well.

The invention also relates to a transmitter station and to a receiver station for use in a presentation system as recited.

Further advantageous aspects are recited in dependent Claims.

BRIEF DESCRIPTION OF THE FIGURES

The invention will be described in detail with respect to the following Figures, which respectively show:

FIGS. 2A, 2C, 3A, 3B, 4A, 4B show various multipart message organization.

DESCRIPTION OF A PREFERRED EMBODIMENT

Figure 1:
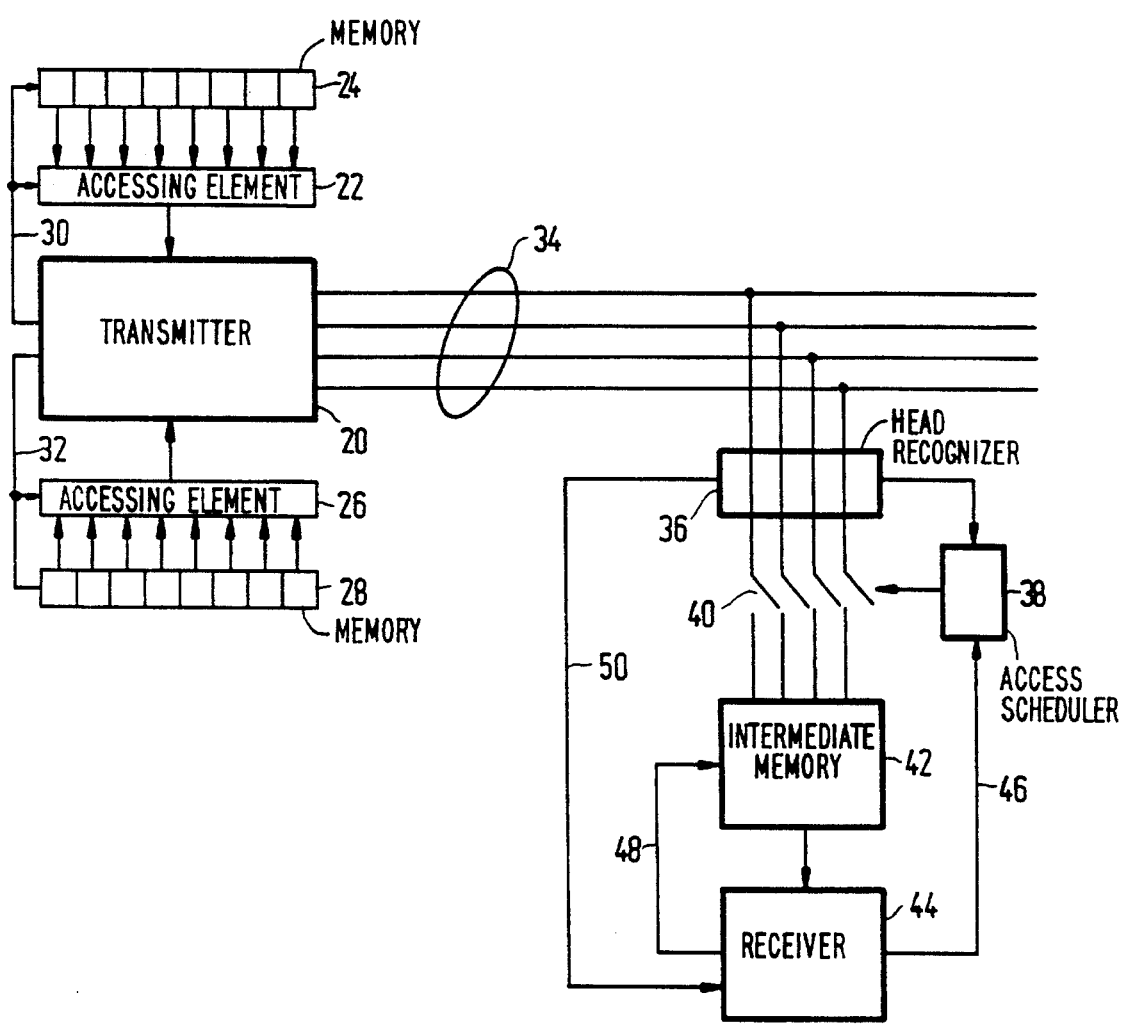
FIG. 1 is a presentation system according to the invention.

FIG. 1 shows a presentation system according to the invention. Presentation or transmitter station 20 is attached to medium 34, which in this case has four parallel channels. Two messages, each containing eight parts, are stored in associated memory 24, 28 and can be read therefrom via accessing elements 22, 26 under control by presentation station 20 via lines 30, 32, on a partwise selective basis. At any time, presentation station 20 may on each channel of medium 34 present a single part. The combined multiplicity of presentation medium 34 equals 4, in consequence. Various examples of presentation patterns will be discussed hereinafter. The channels may be time division multiplex or frequency division multiplex. Presentation may be according to a standard velocity, such as according to a television broadcast standard. Alternatively, presentation could be twice as fast, so that on each physical channel, two logical channels may alternate. Line usage may be privileged to a particular message or intermixed/shared. Various different presentation patterns could be coexistent.

Block 44 is a receiver. Block 36 is a header recognizer. Block 38 is an access scheduler, block 42 acts as intermediate postrecording storage. Receiver 44 signals to scheduler 38 the identity of an intended message. All message parts have a header information that specifies at least message identity and part number with their message. If the first part of the message in question is detected by recognizer 36, this is signalled to scheduler 38, which closes the associated switch of switches 40. Moreover, also the receiver is informed, because in certain circumstances, the receiver may now begin accessing the whole message at a standard presentation velocity. Various successive parts of the message will now be detected/received, and they will be either forwarded directly to receiver 44, or be stored in intermediate storage 42. Access to intermediate storage is by line 48. Scheduler 38 in some cases would know when and where subsequent parts of the message would arrive, so no detection would be necessary. In other cases, such detection is always necessary. In practice, co-packaging of elements 36, 38, 40, 42, 44 renders them collectively a receiver station.

DESCRIPTION OF VARIOUS MULTIPART MESSAGE ORGANIZATIONS

FIG. 2 shows a first multipart message organization. The physical aspects of the presentation are foregone, inasmuch as they may be realized in conventional manner. For one, the message may be a movie, of for example, a duration of 80 minutes. Now, the movie is divided into parts 1 . . . 8 and is transmitted over three channels, A1, A2, A3 respectively, and wherein each block as shown contains the associated part in real time. The maximum latency of part 1 is one block, that is ⅛ of the message's length. After accessing of part 1, other parts are stored as necessary. The top scale indicates the time. When at the start of t1 access has already taken place, part 1 is read and displayed. During interval t2, part 2 is read. During interval t3, part 3 is read. During interval t4, part 4 is read. During interval t5, part 5 is read, and furthermore, part 6 is stored. During interval t6, part 6 is displayed and deleted (if necessary). During interval t7, part 7 is read and part 8 is stored. During interval t8, part 8 is displayed and deleted. Therefore, maximum storage capacity is for one part, which does not appear excessive. If the accessing has just taken place at the beginning of period t5, during that interval part 1 is read, part 6 is stored. During interval t6, part 2 is read, part 3 is stored. During interval t7, part 3 is displayed and deleted, and parts 7, 8 are stored. During interval t8, part 4 is read. During interval t9, part 5 is read. During interval t10, part 6 is displayed and deleted. During interval t11, part 7 is displayed and deleted. During interval t12, part 8 is displayed and deleted. Now, postrecording must accommodate 3 parts, which may be appreciable. The two situations represent the extremes, and the latter storage requirement represents worst FIG. 2B shows the multipart format of the message.

FIG. 2C shows the minimum requirements for presentation: part 1 is presented every interval, part 2 every second interval, part 3 every third interval, and so on. For a maximum latency of one interval, that is ⅛th of the message's length, the presenting of the first message requires 1 channel, of the second ½, etcetera. The total number of equivalent channels is 1+½+ ⅓+ . . . , provided that no interference with other presentation schemes occurs. The postrecording storage is the same as in FIG. 2A: three parts. Here, however, the number of available channels is 5, compared with 3 in FIG. 2A. In theory, the maximum number of parts in the organization of FIG. 2A (first part repeated continually) is ten. In practice, due to number-theoretical problems, it is lower. Generally, the period becomes much longer than the message length; also non-periodic solutions would apply.

FIG. 3 shows a version that is slightly degenerate with respect to FIG. 2, in that the first channel and the first part have been deleted. FIG. 3B now shows the message. FIG. 3A shows the presentation pattern. The maximum latency now is 2/7 at a maximum postrecording capacity of three parts.

FIG. 4 shows a one-channel version, that amazingly, performs better than a straight repetition of the message. Now, the message has 5 parts, maximum latency is 4/5 and storage requirement is three parts.

In general it can be proven that the minimum attainable value for the maximum latency is $\omega=(e^m-1)^{-1}$, wherein m is the multiplicity. For m=3, this yields $\omega_{opt} \cong 1/19$, which is much better than the result of FIG. 2. As will be shown hereinafter, the result of FIG. 2A can be modified to get other, more complicated schemes that perform better.

DIMINISHING STORAGE REQUIREMENTS

In the sequel we use a so-called multiply construction to "average" the use of memory. The idea is as follows.

Let $B=[B_0 \ B_1 \ \ldots \ B_{N-1}]$ be a broadcast (=presentation) scheme with period N and let p, the multiply factor, be a positive integer. Then we form a new scheme $C=[C_0 \ C_1 \ \ldots \ C_{pN-1}]$ with period pN, by defining $$C_{pi+j} := pB_{i+j} + j := \{pb+j | b \in B_{i+j}\}.$$

The new scheme C is again a broadcast wherein B and C have the same maximum waiting time $\omega$. In general the new scheme C can be realised with a smaller memory, i.e., has a smaller M. This is one possible "averaging" construction to decrease M. Note that b represents the elements of column B.

EXAMPLE 1: $\omega=1/3$, $M=1/6$

Our starting point is:

$$\begin{bmatrix} 1 & 1 \\ 2 & 3 \end{bmatrix}$$

This scheme has $\omega=1/3$, and M=0, or 1/3, depending on the time slot in which the request is made (the first slot is numbered 0 as different from FIGS. 2–4). Now, if we multiply by p=2, we obtain $$\begin{bmatrix} 3 & 2 & 3 & 2 \\ 7 & 6 & 5 & 4 \end{bmatrix}$$

This is periodic with period N=4, and has $\omega=1/3$. The average waiting time is only $\omega/2=1/6$. This new scheme has $M=1/6$. This can be seen from the following two memory occupation schedules. The first schedule applies to the case of a request made before time slot 0, i.e. during time slots 2, or 3. The second line gives the contents of postrecording storage.

$$\underline{|2|3|4|5|6|7|}$$
$$\underline{\ \ 4\ |\ 6\ |}$$

The second schedule applies if a request is made before time slot 2, i.e. during time slots 0, or 1.

$$\underline{|2|3|4|5|6|7|}$$
$$\underline{\ \ 5\ |\ 7\ |}$$

It is open to debate whether a practical realisation for the above scheme can be found using this amount of memory. We will discuss this problem at this point. All remarks also apply to the more complicated schemes later. In the first schedule above, during time slot 5 ≡ 1 at the same time part 5 is read from the memory and part 7 is stored into the memory. A solution might be to read and write at double speed, or to use one buffer memory which can store one part (= 1/n) of the message. This last solution could apply to later cases if more than one memory location is used.

Alternatively, instead of using two channels, we might use one channel at double speed (multiplexing). This has great influence on the memory problem. Also, this allows more freedom in the choice of possible broadcast schemes, but does not influence the lower bound on $\omega$ derived earlier. Suppose that each part consists of r frames, where r is large. Let part k consists of frames $k_1, \ldots, k_r$, $k=2, \ldots, 7$. Consider the following, multiplexed, one-channel broadcast scheme derived from the two-channel scheme above in the obvious way.

$$|2_1 4_1 2_2 4_2 \ldots |3_1 7_1 3_2 7_2 \ldots |2_1 5_1 2_2 6_2 \ldots |3_1 7_1 3_2 7_2 \ldots |$$

This broadcast scheme can be realized with $M=1/6$ while avoiding simultaneous reading/writing in the memory.

EXAMPLE 2: $\omega=1/5$, $M=1/10$, m=3

Our starting point is $$\begin{bmatrix} 1 & 1 \\ 2 & 3 \\ 4 & 5 \end{bmatrix}$$

This scheme has $\omega=1/5$, and M=0, or 1/5, depending on the time slot in which the request is made. The basic construction to multiply by p=2, gives $$\begin{bmatrix} 2 & 3 & 2 & 3 \\ 4 & 7 & 6 & 5 \\ 8 & 11 & 10 & 9 \end{bmatrix}$$

This new scheme is periodic with period N=4, and has $\omega=1/5$. The average waiting time for this scheme is only $\omega/2=1/10$. This new scheme has $M=1/10$.

EXAMPLE 3: $\omega=1/7$, $M=3/14$

Our starting point is derived from the last scheme in Example 1.

$$\begin{bmatrix} 1 & 1 & 1 & 1 \\ 2 & 3 & 2 & 3 \\ 4 & 7 & 6 & 5 \end{bmatrix}$$

This scheme has $\omega=1/7$, and $M=1/7$, or 2/7, depending on the time slot in which the request is made. Multiply by p=2, gives:

$$\begin{bmatrix} 2 & 3 & 2 & 3 & 2 & 3 & 2 & 3 \\ 4 & 7 & 6 & 5 & 4 & 7 & 6 & 5 \\ 8 & 15 & 14 & 13 & 12 & 11 & 10 & 9 \end{bmatrix}$$

This new scheme, which is periodic with period N=8, still has $\omega=1/7$. The average waiting time is only $\omega/2=1/14$. This new scheme has $M=3/14$.

EXAMPLE 4: $\omega=1/7$, $M=1/14$, $m=4$

Our starting point is $$\begin{bmatrix} 1 & 1 \\ 2 & 3 \\ 4 & 5 \\ 6 & 7 \end{bmatrix}$$

This scheme has $\omega=1/7$, and $M=6$, or $1/7$, depending on the time slot in which the request is made. Multiply by $p=2$ obtains $$\begin{bmatrix} 2 & 3 & 2 & 3 \\ 4 & 7 & 6 & 5 \\ 8 & 11 & 10 & 9 \\ 12 & 15 & 14 & 13 \end{bmatrix}$$

This new scheme is periodic with period $N=4$, and has $\omega=1/7$. The average waiting time is $\omega/2=1/14$.

EXAMPLE 5: $\omega=1/11$, $M=3/22$

Our starting point is $$\begin{bmatrix} 1 & 1 & 1 & 1 \\ 2 & 3 & 2 & 3 \\ 4 & 7 & 6 & 5 \\ 8 & 11 & 10 & 9 \end{bmatrix}$$

This scheme has $\omega=1/11$, and $M=1/11$, or $2/11$, depending on the time slot in which the request is made. Multiply by $p=2$, obtains $$\begin{bmatrix} 2 & 3 & 2 & 3 & 2 & 3 & 2 & 3 \\ 4 & 7 & 6 & 5 & 4 & 7 & 6 & 5 \\ 8 & 15 & 14 & 13 & 12 & 11 & 10 & 9 \\ 16 & 23 & 22 & 21 & 20 & 19 & 18 & 17 \end{bmatrix}$$

This new scheme is periodic with period $N=8$, and has $\omega=1/11$. The average waiting time is only $\omega/2=1/22$. This new scheme has $M=3/22$.

EXAMPLE 6

Consider the following three broadcast schemes A, B, and B' defined below.

$$A := \begin{bmatrix} 1 & 1 & 1 & 1 & 1 & 1 \\ 7 & 2 & 3 & 2 & 5 & 2 \\ 4 & 8 & 5 & 4 & 6 & 3 \end{bmatrix},$$

We claim:

1. A method of displaying data on a receiver, said method comprising the steps of:
    dividing the data into a plurality of parts, each part having a sequence identification; and
    recurrently transmitting the plurality of parts to the receiver for display, wherein the average recurrency is substantially a monotonously non-increasing function of the sequence identification of the plurality of the parts.

2. A method of displaying data on a receiver, said method comprising:
    dividing the data into a plurality of parts, each part having a sequence identification; and
    recurrently transmitting the plurality of parts to the receiver for display, wherein the average recurrency is substantially a monotonously non-increasing function of the sequence identification of the plurality of the parts and wherein at least one part having a predetermined sequence identification number greater than a predetermined value is transmitted in a non-periodic manner and wherein at all parts of the data having sequence identification numbers less than the predetermined value are transmitted in a periodic manner.

3. The method of claim 1, wherein the step of recurrently transmitting includes transmitting more than one part of the data sequence during a single period.

4. The method of claim 1, wherein the step of recurrently transmitting includes transmitting three parts of the data sequence during a single period.

5. The method of claim 1, wherein the data includes audio information.

6. The method of claim 1, wherein the data includes video information.

7. The method of claim 1, wherein the data includes computer data.

8. The method of claim 1, wherein the data is transmitted to the receiver in one of time-division multiplex organization and frequency-division multiplex organization.

\* \* \* \* \*